United States Patent
Hahn et al.

[19]

[11] Patent Number: 5,891,343

[45] Date of Patent: Apr. 6, 1999

[54] METHOD FOR REMOVING FERROUS IONS FROM ACIDIC TINNING ELECTROLYTES AND TINNING ELECTROLYTE RECOVERY PLANT FOR IRON USING THE SAME

[75] Inventors: Dieter Hahn, Straubenhardt; Uwe Dreibigacker, Engelsbrand, both of Germany

[73] Assignee: LeaRonal GmbH, Birkenfeld, Germany

[21] Appl. No.: 975,593

[22] Filed: Nov. 20, 1997

[30] Foreign Application Priority Data

Dec. 2, 1996 [EP] European Pat. Off. .............. 96119294

[51] Int. Cl.$^6$ ...................................................... B01D 9/02
[52] U.S. Cl. .......................... 210/737; 210/665; 210/669; 210/710; 210/712; 210/738; 210/772; 210/774; 204/DIG. 13
[58] Field of Search ................................... 210/665, 669, 210/702, 710, 712, 737, 738, 767, 772, 774; 204/DIG. 13

[56] References Cited

U.S. PATENT DOCUMENTS

| | | | |
|---|---|---|---|
| 5,057,290 | 10/1991 | Peterson et al. | 423/140 |
| 5,451,323 | 9/1995 | Akao et al. | 210/665 |
| 5,690,804 | 11/1997 | Kuhlmann et al. | 210/712 |
| 5,785,833 | 7/1998 | Vaughan | 204/525 |

FOREIGN PATENT DOCUMENTS 621 354 A1  3/1994  European Pat. Off. .

OTHER PUBLICATIONS

Japanese Patent No. 06 346 299 A (Abstract). Database WPI, Section Ch, Week 9510, Derwent Publications Ltd., London, GB Class A91, AN 95 070752. (Kawasaki Steel Corp.; 20 Dec. 1994.

*Primary Examiner*—Jay H. Woo
*Assistant Examiner*—Betsey J. Morrison
*Attorney, Agent, or Firm*—Pennie & Edmonds LLP

[57] ABSTRACT

The invention relates to a method for separating ferrous ions from an iron-containing tinning electrolyte on the basis of methanesulfonic acid or phenolsulfonic acid, comprising the following steps:

(a) providing a concentrated tin and iron-containing electrolyte containing 0.75 mols/l or more methanesulfonic acid phenolsulfonic acid (b) agitating and cooling the concentrated electrolyte to temperatures at which an insoluble Fe-salt preciptates (c) separating the insoluble precipitate to recover an electrolyte with a reduced iron concentration.

and a recovery plant for tinning electrolytes on the basis of methanesulfonic acid or phenolsulfonic acid wherein this method is employed.

14 Claims, No Drawings

METHOD FOR REMOVING FERROUS IONS FROM ACIDIC TINNING ELECTROLYTES AND TINNING ELECTROLYTE RECOVERY PLANT FOR IRON USING THE SAME

TECHNICAL FIELD

The present invention relates to a method for removing ferrous ions from acidic tin baths such as tinning electrolytes which are commonly used in the tinplating industry, and a tinning electrolyte recovery plant wherein this method is employed. More particularly, the present invention relates to a method by which ferrous ions are separated from acidic tinning electrolytes in the form of insoluble ferrous methanesulfonate or ferrous phenolsulfonate in the cold.

BACKGROUND OF THE INVENTION

For the deposition of tin upon a steel sheet or ribbon, mainly acidic solutions containing fluoroborate, phenolsulfonic acid, hydrogen halides or methanesulfonic acid (hereinafter MSA) or mixtures of these acids have been used in the tinplating industry. These acidic electrolytes all have in common that they attack steel in the initial phase of the electrolysis due to their strong acidity. In this initial stage, the thickness of the deposited tin layer is not yet sufficiently high to protect the steel against the acidic medium, thereby iron is dissolved and remains in the solution because it is not deposited from the strongly acidic electrolyte.

Low concentrations of ferrous ions, ranging from about 1 to 5 g/l can be tolerated in these processes. However, concentrations in the order of 10 to 15 g/l Fe adversely affect the process by narrowing the range of operable current densities and by strongly promoting the oxidation of $Sn^{2+}$ ions into $Sn^{4+}$ions. A broad range of operable current densities is necessary for an effective tin electrolysis. The formation of tin(IV) oxide is very disadvantageous for the tinplating process, because this insoluble oxide drops out of the solution and is collected as a muddy precipitate on the bottom of the tinplating bath; furthermore it may result in porous tin deposits. Therefore suppressing the formation of insoluble tetravalent tin ($SnO_2$) is a major concern in any tinplating process. As this formation is strongly enhanced by the presence of dissolved iron, there have been several attempts to separate ferrous ions from tinplating baths.

The Fe content can be kept constant in processes operating with hydrogen halide by adding soluble sodium ferrocyanide to form a ferrocyanide of iron. However, a different approach has to be taken for tinplating baths operating with a polysulfonic acid, an acidic fluoroborate or MSA electrolyte. In such baths, a lowering of the Fe content has been attempted by diluting the bath with fresh electrolyte and discarding part of the old one, or by plating out tin with insoluble anodes, removing iron by ion exchange and then redissolving the tin. Such processes, however, are very expensive.

A process of precipitating iron with organic or inorganic acids has not been successful because the high proton concentration of the electrolyte causes a precipitation of the acids as such or contributes to redissolving the formed iron compound. A chemical separation of iron by means of a pH change has also proven to be unsatisfactory. At a pH value of around 1.2, divalent tin hydroxide $Sn(OH)_2$ precipitates, while iron only precipitates at pH values of around 3. Even in the best case, only mixtures of $Sn(OH)_2$ and an iron salt such as ferrous oxalate were obtained.

The recently published method of iron separation by means of electrodialysis may lead to precipitates of $Fe(OH)_2$ and Sn(OH)2. In general, such a method is laborious and requires well trained personnel and, furthermore it is doubtful whether it is suitable to comply with the high amounts of metal hydroxides which have to be processed. A typical tinplating bath may have a volume of 100,000 to 120,000 liters. Treatment of such amounts of liquid represents a problem of its own which this invention sets out to avoid. For such reason, a method wherein Sn ions, Fe ions and detrimental cations are absorbed from a tinning liquid by passing the liquid through a strong acid cation exchanger such as described in EP-B-0 621 354 is disadvantageous as well. U.S. Pat. No. 5, 057, 290 discloses processes and apparatus for the closed-loop regeneration of spent hydrochloric acid pickle liquors by recovering ferrous chloride from the spent pickle liquors at very low temperatures. However, this patent does not relate to the recovery of tinning electrolytes and is not concerned with the particular necessity of separating stannous and ferrous ions in such an electrolyte.

In view of the above, the present invention wishes to avoid the above-mentioned problems involved with prior art methods for removing Fe ions from tin electrolytes, particularly from electrolytes used as tinplating baths. Moreover, the present invention aims at providing such a separation method which is reliable, inexpensive, provides a good separation performance and can be operated by personnel without specific education. Furthermore, the method should be suitable for the treatment of large amounts of electrolyte, particularly MSA-containing electrolyte. It would be especially advantageous if the method was also suitable for electrolytes containing a mixture of MSA and sulfuric acid.

A further object underlying the present invention is to provide a recovery plant for tinning electrolytes which allows the separation of ferrous ions from iron-containing tin electrolytes on the basis of MSA and, optionally, sulfuric acid.

SUMMARY OF THE INVENTION

The inventors found that the compound ferrous methanesulfonate precipitates from a ferrous ions-containing acidic tin electrolyte on MSA basis at a higher temperature than tin methanesulfonate. Thus, a separation of ferrous methanesulfonate and tin methanesulfonate becomes possible at low temperatures. It was further found that the separation behavior is dependent on the concentration of free methanesulfonic acid and the total dissolved salts and that agitation of the cooled electrolyte is effective in reducing the freezing point of the solution. The present invention was accomplished on the basis of these findings.

More precisely, the present invention provides:

A method for separating ferrous ions from an iron-containing tinning electrolyte on the basis of methanesulfonic acid or phenolsulfonic acid, comprising the following steps:

(a) providing a concentrated tin and iron-containing electrolyte containing 0.75 mols/l or more methanesulfonic acid or phenolsulfonic acid (b) cooling the concentrated electrolyte to temperatures at which an insoluble Fe-salt precipitates while providing agitation to limit or prevent the formation of ice (c) separating the insoluble precipitate to recover an electrolyte with a reduced iron concentration.

In a preferred embodiment, the method according to the present invention further comprises the steps of:

(d) washing the insoluble precipitate with a cold mixture of water and methanesulfonic acid (e) recovering methanesulfonic acid from said precipitate by ion exchange.

Additionally, a step (f) may be provided which comprises recycling of the recovered concentrated electrolyte from step (c) into the original tinning electrolyte or a tin dissolving station.

Furthermore, subject-matter of the present invention is:

A recovery plant for tinning electrolytes on the basis of methanesulfonic acid, which comprises:

- a device for concentrating the electrolyte to obtain a concentrated tin and iron-containing electrolyte on the basis of methanesulfonic acid or phenolsulfonic acid
- a device for cooling the concentrated electrolyte to temperatures at which an insoluble Fe-salt precipitates
- optionally supply means for feeding a solution of methanesulfonic acid or phenolsulfonic acid into the concentrated electrolyte
- a device for separating the iron-containing precipitate from the concentrated electrolyte
- conducts for recycling the recovered concentrated electrolyte into the original tinning electrolyte or a tin dissolving station In a preferred embodiment, the above recovery plant, according to the present invention, further comprises a device for recovering methanesulfonic acid or phenolsulfonic acid from said iron-containing precipitate such as an ion exchanger and/or a device for washing the obtained precipitate with a cold mixture of water and methanesulfonic acid or phenolsulfonic acid.

BEST MODE FOR CARRYING OUT THE INVENTION

According to the invention, a method for separating ferrous ions from an iron-containing tinning electrolyte on the basis of methanesulfonic acid (or phenolsulfonic acid, the same applies hereinafter) is provided. The tinning electrolyte can be any solution suitable for the electrodeposition (plating) of tin on other metals, particularly iron or iron alloys. Such electrolytes are commonly used in the tinplating industry. The tinning electrolyte in the present invention should be on the basis of methanesulfonic acid, i.e. it should contain an aqueous acidic solution mainly consisting of methanesulfonic acid. Optionally, one or more further acids may be present as well. For cost reasons, sulfuric acid is often used to replace part of the methanesulfonic acid. A particularly suitable tinning electrolyte for use in the present invention is Ronastan® TP containing about 20 g/l Sn, 25 to 100 g/l MSA, 2.0 g/l $H_2SO_4$ and 7% w/v of additives (organic compounds, e.g. antioxidants). The pH value of this electrolyte is around 0.8 at room temperature.

Commercial tinning and tinplating electrolytes are either operated with soluble or insoluble anodes. Soluble anodes are made of metallic tin, while insoluble anodes consist of e.g. platinum, iridium or another suitable inert metal. The latter case usually requires an additional tin dissolving station to bring metallic tin into the dissolved state. The thus obtained solution containing stannous ions is then transferred into the tinplating bath. The expression "tinning electrolyte" should be understood here as including both a tinning or tinplating electrolyte with soluble and insoluble anodes. In the latter case it is, however, more advantageous to recirculate the recovered electrolyte into the tin dissolving station rather than into the tinning electrolyte itself.

During the tinning or tinplating process, the MSA dissolves part of the iron out of the steel ribbon or sheet, which accumulates in the tinning electrolyte. Typical iron content values in a tinning electrolyte after some time in use are 10–25 g/l Fe. As iron forms salts with methanesulfonic acid, MSA is bound in the electrolyte. If part of the electrolyte is removed and replaced with fresh electrolyte, as was the industrial practice in the state of the art, relatively large amounts of expensive MSA must be supplemented to maintain the acid content of the electrolyte. This is disadvantageous both from an economical and ecological point of view. One of the objects of the invention therefore is to find a convenient method for recovering the methanesulfonic acid from its ferrous salt so that it may be reused in a tinning electrolyte.

In view of the above, the invention comprises a multi-step method which is essentially based on the different solubilities of tin methanesulfonate and ferrous methanesulfonate in the cold, which were heretofore unknown.

In step (a) of the method according to the present invention, a concentrated tin and iron-containing electrolyte containing 0.75 mols/l or more methanesulfonic acid is provided. The term "concentrated tin and iron-containing electrolyte" means any electrolyte wherein the concentration of methanesulfonic acid and, preferably, also of tin and iron is higher than in a normal electrolyte used for tinning or tinplating. Such a concentrated electrolyte can be prepared by concentrating a normal tinning electrolyte to about 50% of its original volume or less, more preferably 40% or less, most preferably about ⅓. This concentration can be carried out by conventional means, e.g. by applying a vacuum, by distillation or by a combination thereof Particularly preferable is a cautious heating of the electrolyte to about 40° C. under a pressure of about 2130 Pa (16 Torr). Increasing the concentration, particularly the MSA concentration, serves to lower the freezing point of the electrolyte. Conventional electrolytes for tin plating processes have an MSA concentration of about 2.5–10% by weight. The freezing point of e.g. a solution containing about 20 g tin methanesulfonate, 12 g iron as methanesulfonate and 7% w/v Ronastan® additives would be around –1° to –5° C. in static conditions. If the concentration of free MSA in the electrolyte is increased to 15–18%, the freezing point is lowered even more. Agitating the solution lowers the freezing point still further.

The concentrated electrolyte used in step (a) can also be provided just by adding methanesulfonic acid to a regular tinning electrolyte, without a concentration process. MSA is commercially available as a 70% aqueous solution having a freezing point of about –60° C. However, in view of the high costs of methanesulfonic acid, this is a less preferred embodiment of the invention.

The most favorable way to prepare a concentrated tin and iron-containing electrolyte containing 0.75 mols/l or more methanesulfonic acid is to concentrate a commercial tinning electrolyte. The addition of further methanesulfonic acid can optionally be performed before or during the cooling (step (b)). By vigorously agitating the solution the freezing point of the concentrated electrolyte can be decreased. Preferably the electrolyte is stirred during the cooling process by conventional means. According to the present invention, a 0.75 mols/l or higher concentration of methanesulfonic acid in the electrolyte, preferably about 1 mol/l or more, is favorable in view of the desirable lowering of the freezing point on the one hand and overall costs on the other. Furthermore, the MSA contributes to a better crystallization of the ferrous methanesulfonate.

The concentrated tin and iron-containing electrolyte as provided in step (a) is an electrolyte on the basis of methanesulfonic acid or phenolsulfonic acid and may, optionally, contain further acids such as sulfuric acid, and additives. This concentrated electrolyte is cooled in step (b) to temperatures at which an insoluble Fe-salt precipitates. These temperatures depend on the exact state and composition of the electrolyte. Typically, the electrolyte is cooled to temperatures of about 0°C. or less. At temperatures below about 0°C., an insoluble iron salt (Fe salt) precipitates which essentially consists of ferrous methanesulfonate or phenolsulfonate and, optionally, other ferrous salts such as ferrous sulfate. The concentration of tin methanesulfonate in the precipitate is fairly small, about 2% by weight or less, and may, in a preferable embodiment of the invention, be further reduced by washing the ferrous methanesulfonate crystals with a cold mixture of water and MSA (about 25% by volume), step (d).

In step (c), the iron-containing precipitate is separated from the concentrated electrolyte by conventional means, preferably by centrifugation or filtration techniques. Most preferable is centrifugation. The concentrate still contains approx. 7% of the original Fe concentration, whereby account has been taken for the volume change. In step (e), which is a further preferred embodiment of the present invention, the methanesulfonic acid is recovered from said iron-containing precipitate, e.g. by means of ion exchange. The recovered methanesulfonic acid may be reused to provide the electrolyte used in step (a) or for other purposes, e.g. to be supplemented into a tinning electrolyte.

In the present invention a step (f) may be additionally provided which comprises the recycling of the concentrated electrolyte into the original tinning electrolyte or a tin dissolving station. Thus, the present invention allows a complete method for recovering a Fe-containing tinning electrolyte by removing the undesirable iron component and recycling the valuable tin and MSA component.

Furthermore, the present invention provides a recovery plant for tinning electrolytes on the basis of methanesulfonic acid, which is suitable for conducting the above process. This plant may comprise:
- a device for concentrating the electrolyte. Such a device may be a conventional distillation apparatus which can preferably be operated under vacuum;
- a device for cooling the concentrated electrolyte to temperatures at which an insoluble Fe-salt precipitates. This device may be a container equipped with agitating means which is filled with the concentrated electrolyte and can be cooled with an external cooling fluid. In such a cooled container, a precipitate is obtained which consists essentially of ferrous methanesulfonate and, optionally, other ferrous salts such as ferrous sulfate or mixed salts thereof;
- optionally, supply means for feeding methanesulfonic acid or phenolsulfonic acid, preferably a 70% aqueous solution thereof, into the concentrated electrolyte.
- a device for separating said iron-containing precipitate from the concentrated electrolyte
- conducts for recycling the recovered concentrated electrolyte into the original tinning electrolyte or a tin dissolving station and, preferably,
- an ion exchanger for recovering methanesulfonic acid or phenolsulfonic acid from said iron-containing precipitate.

In a preferred embodiment, the above apparatus according to the present invention further comprises a device for washing the obtained precipitate with a cold mixture of water and methanesulfonic acid or phenolsulfonic acid.

The invention is further illustrated in the following examples wherein all percentages are weight percentages unless indicated otherwise.

EXAMPLE 1

3700 ml tinning electrolyte Ronastan® TP-Sn-electrolyte (Fa. Rasselstein) were concentrated to 1200 ml by cautious distillation under vacuum. The concentrated electrolyte was poured into a glass reactor and put into a methanol bath. The methanol bath was gradually cooled by adding dry ice. The original electrolyte had an acid content (MSA) of 55 g/l, a content of ferrous ions of 10 g/l and a content of stannous ions of 18–19 g/l. After the concentration, the respective values were 165 g/l acid, 33 g/l Fe and 55 g/l Sn.

After cooling to a temperature of −7° C. under stirring, some ice crystals started to form as well as a solid precipitate. The solid matters were removed by filtration, and contained primarily Fe MSA and a negligible amount of Sn.

Thereafter 30 ml of 70% MSA were added and the cooling was continued to a temperature of −17.4° C. The electrolyte could now be separated by filtration into a solid portion containing 60 g/l Fe and a liquid containing 14 g/l Fe and 70 g/l Sn (the increased Sn concentration is due to the removal of some water in the form of ice and hydration water in the Fe MSA-crystals). The cooling was continued and at −23° C. (external bath temperature) further 30 ml 70% MSA were added and a further filtration process was carried out. The slightly green filtrate now contained 3.4 g/l Fe and 67 g/l Sn and the filtration residue proved to be a paste-like solid phase without a tendency to melt.

Further 30 ml of 70% MSA solution were added and a further filtration was carried out while gradually cooling the mixture down to −30° C. and agitating heavily. The final liquid electrolyte had a concentration of 1.5 g/l Fe and 65 g/l Sn and an acid content of about 255 g/l This concentrated recovered electrolyte was diluted to an Fe concentration of 0.5 g/l and then reused in the original tinning electrolyte.

The solid ferrous methanesulfonate crystals were dissolved in warm water and passed through an acidic ion exchanger to recover MSA in very good yields.

EXAMPLE 2–4

Each 35 liters of a concentrated Ronastan®TP-Sn electrolyte were treated according to the procedure of example 1. The final temperature of the cooling liquid was −30° C., and the corresponding temperature of the electrolyte was −29° C. The content of ferrous ions was determined by atomic absorption spectroscopy. The initial and final Fe contents in the electrolyte were recorded.

results are shown in the following Table:

| Ex. No. | Initial Fe content (g/l) | Final Fe content (g/l) |
|---|---|---|
| 2 | 33 | 4 |
| 3 | 33 | 6 |
| 4 | 33 | 3 |

We claim:
1. A method for separating ferrous ions from an iron-containing tinning electrolyte on the basis of methanesulfonic acid or phenolsulfonic acid, comprising the following steps:
   (a) providing a concentrated tin and iron-containing electrolyte containing 0.75 mol/l or more methanesulfonic acid or phenolsulfonic acid

(b) agitating and cooling the concentrated electrolyte to temperatures at which an insoluble Fe-salt precipitates (c) separating the insoluble precipitate to recover an electrolyte with a reduced iron concentration.

2. The method according to claim 1 which further comprises at least one of the following steps:

(d) washing the insoluble precipitate with a cold mixture of water and methanesulfonic acid or phenolsulfonic acid (e) recovering methanesulfonic acid or phenolsulfonic acid from said precipitate by ion exchange.

3. The method according to claim 1 further comprising a step (f) which comprises recycling of the recovered concentrated electrolyte from step (c) into the original tinning electrolyte or a tin dissolving station.

4. The method according to claim 1 wherein the electrolyte contains methanesulfonic acid or a mixture of methanesulfonic acid and sulfuric acid as acidifying agent.

5. The method according to claim 1 wherein the concentrated tin and iron-containing electrolyte used in step (a) is prepared by concentrating a tinning electrolyte to $\frac{1}{3}$ of its original volume by vacuum distillation and optionally adding methanesulfonic acid or phenolsulfonic acid.

6. The method according to claim 1 wherein in step (b), the electrolyte is cooled to temperatures of +5° C. or less.

7. The method according to claim 1 wherein the concentration of methanesulfonic acid or phenolsulfonic acid in the tin and iron-containing electrolyte used in step (a) is 1 mol/l or more.

8. A method for separating ferrous ions from an iron-containing tinning electrolyte on the basis of methanesulfonic acid, comprising the following steps:

(a) providing a concentrated tin and iron-containing electrolyte containing 0.75 mol/l or more methanesulfonic acid (b) agitating and cooling the concentrated electrolyte to temperatures at which an insoluble Fe-salt precipitates (c) separating the insoluble precipitate to recover an electrolyte with a reduced iron concentration.

9. The method according to claim 8 which further comprises at least one of the following steps:

(d) washing the insoluble precipitate with a cold mixture of water and methanesulfonic acid (e) recovering methanesulfonic acid from said precipitate by ion exchange.

10. The method according to claim 9 further comprising a step (f) which comprises recycling of the recovered concentrated electrolyte from step (c) into the original tinning electrolyte or a tin dissolving station.

11. The method according to claim 8 wherein the electrolyte contains methanesulfonic acid or a mixture of methanesulfonic acid and sulfuric acid as acidifying agent.

12. The method according to claim 8 wherein the concentrated tin and iron-containing electrolyte used in step (a) is prepared by concentrating a tinning electrolyte to $\frac{1}{3}$ of its original volume by vacuum distillation and optionally adding methanesulfonic acid.

13. The method according to claim 8 wherein in step (b), the electrolyte is cooled to temperatures of +5° C. or less under stirring.

14. The method according claim 8 wherein the concentration of methanesulfonic acid in the tin and iron-containing electrolyte used in step (a) is 1 mol/l or more.

* * * * *